(No Model.)

L. W. CLARK.
CUTTER MECHANISM FOR REAPERS.

No. 374,397. Patented Dec. 6, 1887.

Witnesses
A. E. Dowell.
J. T. F. Johnson.

Inventor
L. W. Clark
By his Attorney T. H. Alexander

UNITED STATES PATENT OFFICE.

LYMAN WILSON CLARK, OF ALBANY, OREGON.

CUTTER MECHANISM FOR REAPERS.

SPECIFICATION forming part of Letters Patent No. 374,397, dated December 6, 1887.

Application filed July 16, 1887. Serial No. 244,438. (No model.)

*To all whom it may concern:*

Be it known that I, LYMAN WILSON CLARK, of Albany, in the county of Linn and State of Oregon, have invented certain new and useful Improvements in Cutter Mechanisms for Reapers; and I do hereby declare that the following is a full, clear, and exact description thereof, reference being had to the accompanying drawings, and to the letters of reference marked thereon, which form part of this specification, in which—

Figure 1:
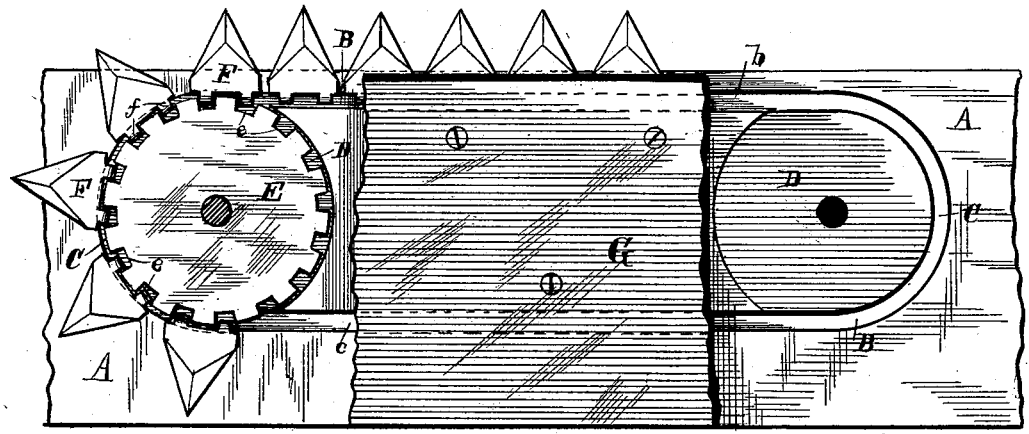
Figure 2:
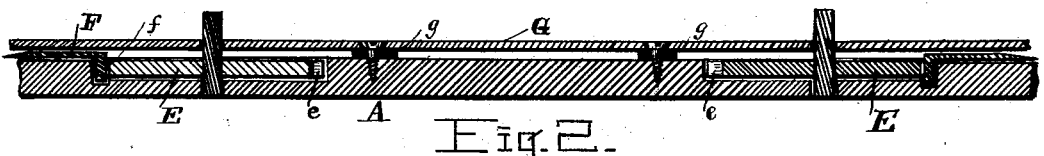
Figure 3:
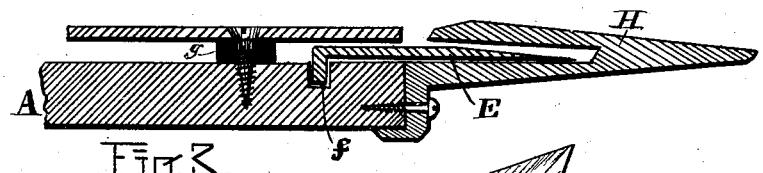
Figure 4:
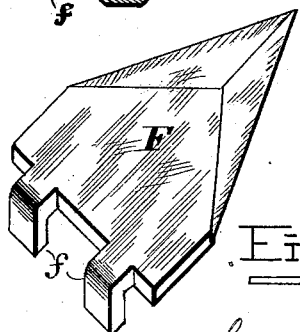

Figure 1 is a top plan detail view of my improved cutting device for reaping-machines, the top plate being partly broken away to show the drive-wheel for the cutters. Fig. 2 is a central longitudinal section of the same. Fig. 3 is a detail cross-section, enlarged. Fig. 4 is a perspective view of one of the cutters detached.

This invention relates to improvements in cutting devices for reaping and mowing machines; and it has for its objects to provide a cutting device in which are employed a series of movable independent cutters, forming when in operation an endless-belt cutter-bar.

The invention further consists in the peculiar construction of the said cutters and in the devices for operating and retaining them in the proper position, all of which will be fully understood from the following description, when taken in connection with the accompanying drawings, and particularly specified in the claims hereto appended.

Referring to the drawings by letters, A designates the bed-plate of the device, which has its outer edge lying in the plane usually occupied by the ordinary reciprocating cutter-bars of reapers and similar machines. This plate is provided near its periphery and in its upper face with the continuous groove or channel B, the front edge, *b*, of which runs close to and parallel with the front edge of plate A for a distance corresponding to the width of the swath or ordinarily cutting sweep of the machine. At the opposite ends of plate A the groove B is rounded on equal arcs C C, which are united by the portion *c* of the groove, which runs parallel with the part *b* thereof. The groove B thus completed forms one continuous and unbroken channel, as is obvious. At the opposite ends of plate A, in its upper surface and within the bends C C of the groove B, are formed the circular depressions or sinks D D, which correspond in diameter to the diameter of the circles on which arcs C C are formed, and the bottoms of sinks D D are about flush with the bottom of groove B. In these sinks D are journaled upon suitable shafts the wheels E E, the peripheries of which are provided with notches *e e*, hereinafter referred to and at corresponding distances apart. The shafts of wheels E E are preferably extended through their journal-bearings on plate G, and one or both of the shafts of these wheels are provided above plate G with proper gearings for rotating said wheels, (not shown in the drawings,) as any convenient device may be employed for rotating one or both of said wheels from any proper source of power.

F F designate the cutters proper, which are each composed of a triangular or other proper shape blade having its inner end squared and provided with the downwardly-depending lips or lugs *f f*, as shown, there being preferably two of these lugs for each cutter, and situated at corresponding distances apart, and from the ends of the blade, as shown, the outer or front edges of the cutters F are properly sharpened. The cutters F F are set in position for use by placing them upon plate A, with their lugs *f f* entering the groove B, and a sufficient number of these cutters are employed to completely fill said groove, the notches *e e* in wheels E E receiving these lugs when the cutters F are at the ends C C of the groove, as shown.

G designates a top plate or covering secured on plate A, above cutters F and wheels E, being preferably mounted on washers *g g*, as shown, so as to not bind on the wheels or on the cutters, but yet will effectually prevent the escape of either from the groove B or sinks D. The front edge of plate G is flush with the edge of plate A, and the cutters F F are of such size that their cutting-edges project beyond the edges of said plates, and consequently are not hindered in their action thereby.

H designates the guard-fingers for the cutters F F, secured as shown, or in other suitable manner, to the front edge of plate A, and arranged to permit the cutters F F to play freely through their slots, as is evident.

The operation of the device is as follows:

Upon the actuation of one or both wheels E, the cutters F F engage in the notches e e therein by their lugs f f, are moved around therewith in groove B, and as the groove is filled with said cutters the cutters in front of the cutters advanced by wheel are pushed forward and transmit the forward motion to all the cutters in said groove, so that they receive a continuous movement in said groove, and when only one wheel E is actuated the movements of the cutters F will cause the rotation of the opposite wheel E, so that there is no retardation or strain of the parts. In other words, the wheels E successively catch the cutters from one part, b or c, of groove B and force them around to the opposite portion, this action transmitting movement to all the cutters in said groove. The cutters F F, being disconnected, can be made very light. Consequently they can be moved at greater speed and with less power than would be the case were they linked together, as in such cases the cutters have to be made very heavy, in order to give them sufficient strength to drag the succeeding cutters connected therewith when they are operated.

In my invention it will be observed that there is no pulling strain on the cutters—only pushing. Consequently their weight can be greatly lessened.

By having the cutters independent they can be easily removed for replacing, repairs, or for sharpening, and there are no rivets or joints to work loose, necessitating annoying and expensive delays in repairing. It will also be observed that the lugs f f of cutters F F not only retain the cutters in position in groove B and guide them therein, but they are also the means by which the cutters can be actuated by the wheels E E. The bends of groove B are made of sufficient diameter to prevent binding of the cutters in passing therethrough.

Having described my invention, what I claim is—

1. The improved cutter mechanism for reapers herein described, consisting of a bed-plate having a continuous groove, B, in its upper surface, the notched wheels E, rotating in countersinks at and within the bends of groove B, the independent cutters F, provided with depending lugs f, for engaging in groove B and with the notches of wheels E, and the top plate, G, for retaining the cutters in said groove, all constructed and arranged substantially as and for the purpose described.

2. The combination, with the bed-plate A, having groove B and sinks D D, and the wheels E E, having notches e e in their peripheries, journaled in said sinks D, and suitable devices for rotating said wheels, of the independent cutters F F, provided with lugs f, for engaging groove B and the notches e of the wheels, and the top plate, G, for retaining said cutters in position, all constructed and arranged substantially in the manner and for the purpose described.

In testimony that I claim the foregoing as my own I affix my signature in presence of two witnesses.

LYMAN WILSON CLARK.

Witnesses:
  J. K. WEATHERFORD,
  D. R. N. BLACKBURN.